D. GOODNOW, Jr.
Device for Cutting Out Sheet Metal Washers.

No. 160,015

Patented Feb. 23, 1875.

WITNESSES.
F. Hunnewell
W. E. Boardman

Daniel Goodnow, Jr.
F. Curtis, Att'y.

UNITED STATES PATENT OFFICE.

DANIEL GOODNOW, JR., OF BOSTON, MASSACHUSETTS.

IMPROVEMENT IN DEVICES FOR CUTTING OUT SHEET-METAL WASHERS.

Specification forming part of Letters Patent No. 160,015, dated February 23, 1875; application filed January 28, 1875.

*To all whom it may concern:*

Be it known that I, DANIEL GOODNOW, Jr., of Boston, Suffolk county, Massachusetts, have invented an Improvement in Instruments for Cutting Washers, &c., of which the following is a specification:

My present improvement is based upon a class of instruments for cutting washers and analogous articles from sheet metal, which consist of a ⊥-shaped stock or head, adapted to a wrench or bit-stock, and provided with a fixed "center," upon which the stock rotates, and with adjustable cutters, mounted upon or connected with the stock, one upon each side its center, the rotation of the cutters about the center having the effect of cutting the washer or planchet from the metal sheet or other material.

My improvement consists in the peculiar manner of attaching the adjustable cutters to the cutter head or stock, by which I obtain great strength and hold upon such cutters, and maintain at all times a secure gripe and tight joint between them and the stock.

Figure 1:
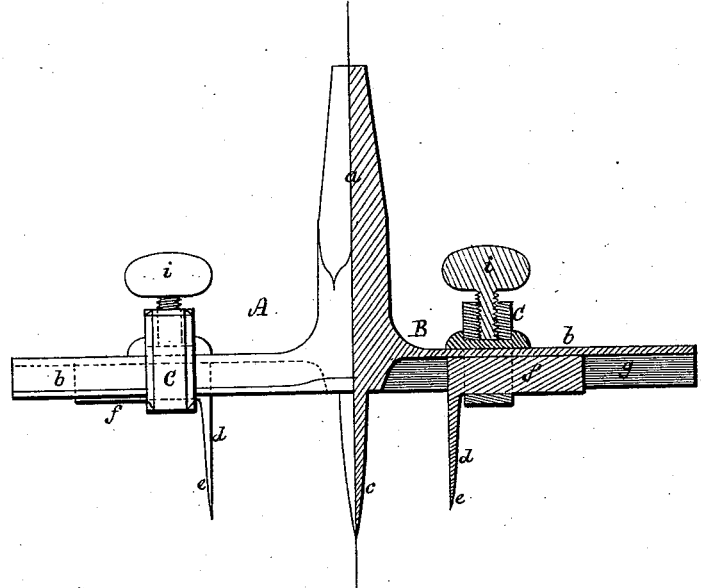
Figure 2:
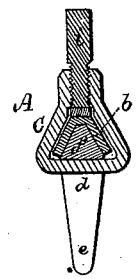

The drawings accompanying this specification represent, in Figure 1, a partial sectional elevation, and in Fig. 2 a cross-section, of an instrument embodying my improvement.

In these drawings, A represents the ⊥-shaped stock or head of the instrument, of which $a$ is the tang or shank which enters the bit-stock; and $b\ b$, the two lateral arms or branches of the beam B, which depart from each side the shank, a pointed prong or center, $c$, depending from the center of the beam B, and constituting the point of rotation of the instrument. $d\ d$ represent two twin-shaped right-angular cutters, the knife portions or blades $e$ of which depend below the beam B, while the shank or base portions $f$ are frusto-pyramidal or wedge-shaped in cross-section, and fit within grooves $g$, of like shape, created in the under side of the beam B. C C represent two yokes or clasps, which encompass each branch $b\ b$ of the beam B, and also the shank of each cutter; and each yoke is provided with a clamp-screw, $i$, which screws through its upper part and down upon the top of the beam, as represented in the accompanying drawings.

Owing to the tapering or wedge form of the shanks $f\ f$, and of the grooves which receive them, it will be at once apparent that I maintain at all times a perfectly close fit between them, and entirely prevent any shaking or chattering of the cutters, while, by means of the yokes C C, I am enabled to clamp the cutters to the beam with great power.

I claim—

The cutters with wedge-shaped shanks, and the beam formed with correspondingly-shaped grooves to receive said shanks, in combination with the encompassing clamping-yokes, substantially as and for the purposes shown and set forth.

DANIEL GOODNOW, JR.

Witnesses:
F. CURTIS,
W. E. BOARDMAN.